US012599981B2

(12) United States Patent
Su et al.

(10) Patent No.: US 12,599,981 B2
(45) Date of Patent: Apr. 14, 2026

(54) WEDM MACHINE TOOL FOR MACHINING DISC-SHAPED POROUS PART

(71) Applicant: GUANGDONG UNIVERSITY OF TECHNOLOGY, Guangzhou (CN)

(72) Inventors: Guokang Su, Guangzhou (CN); Yongjun Zhang, Guangzhou (CN); Zipeng Zhong, Guangzhou (CN); Junfei Li, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 719 days.

(21) Appl. No.: 18/154,819

(22) Filed: Jan. 14, 2023

(65) Prior Publication Data

US 2024/0066617 A1 Feb. 29, 2024

(30) Foreign Application Priority Data

Aug. 30, 2022 (CN) .......................... 202211051839.9

(51) Int. Cl.
B23H 7/10 (2006.01)
B23H 11/00 (2006.01)
(52) U.S. Cl.
CPC ........... B23H 7/105 (2013.01); B23H 11/003 (2013.01)

(58) Field of Classification Search
CPC .......... B23H 11/003; B23H 7/02; B23H 7/10; B23H 7/105
See application file for complete search history.

(56) References Cited

FOREIGN PATENT DOCUMENTS

| | | | |
|---|---|---|---|
| CN | 101428366 A | | 5/2009 |
| CN | 102179582 A | * | 9/2011 |
| CN | 104002001 A | * | 8/2014 |
| CN | 109365935 A | | 2/2019 |

* cited by examiner

*Primary Examiner* — Steven W Crabb
*Assistant Examiner* — Dilnessa B Belay

(57) ABSTRACT

A WEDM machine tool for machining a disc-shaped porous part, comprises a workbench, a central stand column, a rotary device, a plurality of wire rack assemblies and a wire feeding mechanism comprising a bottom plate, a wire rack arranged on the bottom plate and a radial driving mechanism for driving the wire rack to move in a radial direction on the bottom plate; and the wire rack is a "["-shaped rack with an opening oriented to the central stand column; and the wire feeding mechanism comprises a first guide wheel assembly arranged on the workbench to guide an electrode wire into and out of a wire winding barrel, second guide wheel assemblies arranged on the radial driving mechanism and the wire rack, a third guide wheel assembly arranged on the central stand column and a fourth guide wheel assembly arranged between two wire rack assemblies.

6 Claims, 11 Drawing Sheets

WEDM MACHINE TOOL FOR MACHINING DISC-SHAPED POROUS PART

CROSS-REFERENCE TO RELATED APPLICATIONS

This application claims foreign priority of Chinese Patent Application No. 202211051839.9, filed on Aug. 30, 2022, in the China National Intellectual Property Administration, the disclosures of all of which are hereby incorporated by reference.

TECHNICAL FIELD

The present invention relates to the field of wire electrical-discharge machining technologies, and particularly to a WEDM machine tool for machining a disc-shaped porous part.

BACKGROUND

Wire electrical-discharge machining forms a discharge channel through working solution breakdown by an electric field between two electrodes, resulting in instantaneous high-temperature melting and corrosion removal of material by vaporization to achieve the purpose of cutting. The wire electrical-discharge machining is non-contact machining, which has no macroscopic acting force and is not affected by the hardness and strength of material, thus being widely applied in the fields of mold, construction machinery, aerospace and so on.

When a plurality of irregular through holes distributed in a disc-shaped porous part are machined, an existing method is to cut by holes by using a traditional WEDM machine tool, thus having very low efficiency.

In the prior art, in order to improve the cutting efficiency, a plurality of wire cutting stations are provided. For example, the invention patent application with the application publication number CN104002001A discloses a monofilament multi-station wire cutting machine tool, which cuts a ring-shaped part into a plurality of pieces by driving a plurality of independent wire racks to be fed in a radial direction. However, all wire racks of the machine tool above are radially distributed inside the ring-shaped part, and the wire racks cut from inside to outside in a radial direction, so that the machine tool can only perform one-dimensional straight-line cutting, and cannot machine two-dimensional special-shaped holes in the disc-shaped part. Therefore, a WEDM machine tool for machining a disc-shaped porous part is provided to realize synchronous machining of holes in the disc-shaped porous part.

SUMMARY

The present invention aims to overcome the existing problems above, and provide a WEDM machine tool for machining a disc-shaped porous part, wherein the WEDM machine tool can not only realize machining of a two-dimensional hole in the disc-shaped part, but also realize synchronous machining of a plurality of holes, thus greatly improving the machining efficiency.

The objective of the present invention is achieved by the following technical solution.

A WEDM machine tool for machining a disc-shaped porous part comprises a workbench, a central stand column arranged in a middle portion of the workbench, a conical guide centering block coaxially arranged with the central stand column for positioning the disc-shaped part, a rotary device for driving a disc-shaped workpiece to rotate, a plurality of wire rack assemblies arranged on the workbench for machining and a wire feeding mechanism for guiding a feeding direction of an electrode wire, wherein the plurality of wire rack assemblies are radially distributed around a center of the workbench, and the wire rack assembly comprises a bottom plate, a radial driving mechanism arranged on the bottom plate and a wire rack fixed on a sliding block of the radial driving mechanism; and the wire rack is a "["-shaped rack, and an opening of the "["-shaped rack is oriented to the central stand column; and the wire feeding mechanism comprises a first guide wheel assembly arranged on the workbench to guide the electrode wire into and out of a wire winding barrel, second guide wheel assemblies arranged on the radial driving mechanism and the wire rack, a third guide wheel assembly arranged on the central stand column and a fourth guide wheel assembly arranged between two wire rack assemblies; and the electrode wire comes out of the wire winding barrel and passes through the first guide wheel assembly, and then passes through the second guide wheel assembly, and under guidance of the third guide wheel assembly and the fourth guide wheel assembly, the electrode wire passes through the remaining second guide wheel assemblies in sequence, and finally passes through the first guide wheel assembly to return to the wire winding barrel.

A working principle of the WEDM machine tool for machining the disc-shaped porous part is that:

when the disc-shaped porous part needs to be machined, a central hole of the part is sleeved on the central stand column to be placed on the rotary device, the part is centered and positioned by a conical centering block, then the electrode wire is fed up, the electrode wire comes out of the wire winding barrel and passes through the first guide wheel assembly under guidance to enter one second guide wheel assembly, and under guidance of the third guide wheel assembly and the fourth guide wheel assembly, the electrode wire finally passes through the second guide wheel assemblies on the wire racks, and finally passes through the first guide wheel assembly to return to the wire winding barrel; after the feeding up of the electrode wire is completed, the part is machined, the rotary device drives the part to rotate, the radial driving mechanism drives radial feeding of the wire rack, and the wire rack drives radial feeding of the electrode wire and rotation of the part to complete machining of a two-dimensional hole; and the plurality of wire rack assemblies feed at the same time, cooperated with rotation of the part to realize synchronous machining of a plurality of holes.

In a preferred solution of the present invention, a middle portion of the rotary device has a hollow structure, and the central stand column penetrates through the hollow structure of the rotary device. The objective lies in making a structure of the rotary device more compact, and meanwhile, it is convenient to make the rotary device drive the disc-shaped porous part to rotate.

Preferably, the rotary device is provided with the conical guide centering block for positioning the disc-shaped porous part. By arranging the conical guide centering block, the disc-shaped porous part is coaxial with the rotary device without eccentricity, thus ensuring a machining accuracy.

Preferably, the wire rack comprises a vertical arm, an upper arm connected to an upper end of the vertical arm and a lower arm connected to a lower end of the vertical arm; and the second guide wheel assembly comprises a guide wheel arranged above the radial driving mechanism, an upper guide wheel arranged at an end portion of the upper arm and a lower guide wheel arranged at an end portion of the lower arm; and each wire rack assembly is provided with one second guide wheel assembly. In the structure above, the electrode wire may pass through the guide wheel, the lower guide wheel and the upper guide wheel in sequence; or pass through the upper guide wheel, the lower guide wheel and the guide wheel in sequence; a specific wire feeding direction is determined according to an actual machining mode; and the electrode wire between the upper guide wheel and the lower guide wheel is used for cutting the part.

Preferably, each wire rack assembly is capable of rotating around the workbench, so as to adjust an included angle between two adjacent wire rack assemblies. In the structure above, the wire rack assembly may rotate around the workbench, and different positions of the wire rack assembly on the workbench may be adjusted, thus realizing flexible machining of the disc-shaped porous part.

Preferably, six wire rack assemblies are provided, and the six wire rack assemblies respectively correspond to six stations: a station A, a station B, a station C, a station D, a station E and a station F. By reasonably adjusting a position of the wire rack, two holes, three holes, four holes or five holes may be machined.

Preferably, the third guide wheel assembly comprises a first set of steering guide wheels, a second set of steering guide wheels and a third set of steering guide wheels; the first guide wheel assembly comprises a wire inlet guide wheel and a wire outlet guide wheel; and the fourth guide wheel assembly comprises a first tensioning guide wheel and a second tensioning guide wheel.

Preferably, when six uniformly distributed holes are machined, an included angle between two adjacent stations is 60°; and a specific wire feeding route of the electrode wire is that:

the electrode wire comes out of the wire winding barrel, passes through the wire inlet guide wheel to reach a guide wheel in the station A, is steered to a lower guide wheel in the station A, and then is fed upwardly to pass through an upper guide wheel in the station A to enter the first set of steering guide wheels on the central stand column, and under guidance of the first set of steering guide wheels, the electrode wire enters an upper guide wheel in the station B, is fed downwardly to pass through a lower guide wheel in the station B, and then passes through a guide wheel in the station B; then, the electrode wire enters a guide wheel in the station C under guidance of the first tensioning guide wheel to reach a lower guide wheel in the station C, and is fed upwardly to pass through an upper guide wheel in the station C to enter the second set of steering guide wheels on the central stand column, under guidance of the second set of steering guide wheels, the electrode wire enters an upper guide wheel in the station D, is fed downwardly to pass through a lower guide wheel in the station D, and then passes through a guide wheel in the station D; and then, the electrode wire enters a guide wheel in the station E under guidance of the second tensioning guide wheel to reach a lower guide wheel in the station E, and is fed upwardly to pass through an upper guide wheel in the station E to enter the third set of steering guide wheels on the central stand column, and under guidance of the third set of steering guide wheels, the electrode wire enters an upper guide wheel in the station F, is fed downwardly to pass through a lower guide wheel in the station F, then passes through a guide wheel in the station F, and finally passes through the wire outlet guide wheel to return to the wire winding barrel. In the structure above, the third guide wheel assembly and the fourth guide wheel assembly may change a direction of the electrode wire and guide the electrode wire into the wire rack assemblies in different stations, wherein the fourth guide wheel assembly can also play a role in tensioning the electrode wire, thus improving the machining accuracy.

Preferably, when five uniformly distributed holes are machined, a wire rack assembly in the station F is in a non-working state, and wire rack assemblies in remaining stations are in a working state, wherein an included angle between two adjacent stations in the working state is 72°, and the second guide wheel assembly (12) on the wire rack assembly in the station F further comprises an upper auxiliary guide wheel (51) arranged at the upper end of the vertical arm and a lower auxiliary guide wheel (52) arranged at the lower end of the vertical arm; and a specific wire feeding route of the electrode wire is that:

the electrode wire comes out of the wire winding barrel, passes through the wire inlet guide wheel (41) to reach a guide wheel in the station A, is steered to a lower guide wheel in the station A, and then is fed upwardly to pass through an upper guide wheel in the station A to enter the first set of steering guide wheels (141) on the central stand column, and under guidance of the first set of steering guide wheels (141), the electrode wire enters an upper guide wheel in the station B, is fed downwardly to pass through a lower guide wheel in the station B, and then passes through a guide wheel in the station B; then, the electrode wire enters a guide wheel in the station C under guidance of the first tensioning guide wheel (151) to reach a lower guide wheel in the station C, and is fed upwardly to pass through an upper guide wheel in the station C to enter the second set of steering guide wheels (142) on the central stand column, under guidance of the second set of steering guide wheels (142), the electrode wire enters an upper guide wheel in the station D, is fed downwardly to pass through a lower guide wheel in the station D, and then passes through a guide wheel in the station D; and then, the electrode wire enters a guide wheel in the station E under guidance of the second tensioning guide wheel (152) to reach a lower guide wheel in the station E, and is fed upwardly to pass through an upper guide wheel in the station E to enter the third set of steering guide wheels (143) on the central stand column, and under guidance of the third set of steering guide wheels (143), the electrode wire enters an upper guide wheel in the station F, then passes through the upper auxiliary guide wheel (51), is fed downwardly to pass through the lower auxiliary guide wheel (52), then passes through a guide wheel in the station F, and finally passes through the wire outlet guide wheel (48) to return to the wire winding barrel. In the structure above, machining of five uniformly distributed holes and machining of six uniformly distributed holes have a similar wire feeding route, different from the machining of six uniformly distributed holes, in the machining of five uniformly distributed holes, it is unnecessary to feed the electrode wire to the lower guide wheel in the station F, while it is necessary to adjust the wire feeing direction towards the upper auxiliary guide wheel and the lower auxiliary guide wheel, then the electrode wire is fed to the first guide wheel assembly between the station A and the station F, a direction of the electrode wire is adjusted to be parallel to a wire inlet direction by the first guide wheel assembly, and then the electrode wire returns to the wire winding barrel.

Preferably, the first guide wheel assembly is arranged between the station A and the station B; the first, second and third set of steering guide wheels are all provided with two guide wheels; the first, second and third set of steering guide wheels are respectively located in middle portions of extension lines of the station A and the station B, middle portions of extension lines of the station C and the station D, and middle portions of extension lines of the station E and the station F; and the fourth guide wheel assembly is arranged on the workbench, the first tensioning guide wheel is arranged between the station B and the station C, and the second tensioning guide wheel is arranged between the station D and the station E. In the structure above, it is convenient to feed the electrode wire, and a wire feeding distance of the electrode wire can be reduced as much as possible.

Preferably, the center of the workbench is provided with a circular guide boss, an inner end of the bottom plate is provided with an arc-shaped groove, the arc-shaped groove is connected with an outer side of the circular guide boss in a matching mode, an outer end of the bottom plate is provided with a circular arc groove, the circular arc groove is provided with a fixing bolt for fixing the bottom plate on the workbench, and the fixing bolt penetrates through the circular arc groove and is connected with the workbench. By arranging the circular guide boss and the arc-shaped groove, the bottom plate may rotate along the circular guide boss, so that the wire rack assembly rotates around the center of the workbench, and the bottom plate may be accurately positioned at the same time; by arranging the circular arc groove and the fixing bolt, it is convenient to adjust the angle between the wire rack assemblies, and the fixing bolt facilitates fixing and positioning the bottom plate, and also facilitates disassembling the bottom plate; and the circular guide boss and the fixing bolt may position the bottom plate in a radial direction, after the fixing bolt is loosened, the bottom plate is moved in a circumferential direction, and after the bottom plate is moved to a specified position, the fixing bolt is tightened to fix the bottom plate.

Compared with the prior art, the present invention has the following beneficial effects.

1. According to the WEDM machine tool for machining the disc-shaped porous part in the present invention, the rotary device drives the conical guide centering block to rotate, so that the disc-shaped part is driven to rotate, and by matching with the radial driving mechanism, the wire rack is driven to feed in the radial direction, so as to drive the electrode wire of the second guide wheel assembly to feed continuously, thus completing the machining of the two-dimensional hole, the plurality of wire rack assemblies work at the same time, which can realize the synchronous machining of the plurality of holes, and a multi-station synchronous machining mode is used, which has the advantages of high machining efficiency, small workpiece deformation and small area occupied by the machine tool.

2. According to the WEDM machine tool for machining the disc-shaped porous part in the present invention, the wire rack is the "["-shaped rack, and the opening of the "["-shaped rack is oriented to the central stand column, so that the wire rack assembly is arranged on the outer side of the disc-shaped part, and when the rotary device drives the disc-shaped part to rotate, there is no interfere with the wire rack in space, thus being convenient for machining.

3. According to the preferred solutions in the present invention, by arranging the conical guide centering block, the disc-shaped porous part is coaxial with the rotary device without eccentricity, thus ensuring the machining accuracy.

BRIEF DESCRIPTION OF THE DRAWINGS

FIG. 3 to FIG. 4 are schematic structural diagrams of First Embodiment of the WEDM machine tool in the present invention, wherein FIG. 3 is a stereoscopic diagram, and FIG. 4 is a top view.

FIG. 8 to FIG. 10 are schematic structural diagrams of a wire rack assembly in the present invention, wherein FIG. 8 is a stereoscopic diagram, FIG. 9 is a stereoscopic diagram from another perspective, and FIG. 10 is a stereoscopic diagram from a third perspective.

DETAILED DESCRIPTION

In order to make those skilled in the art better understand the technical solution of the present invention, the present invention is further described in detail hereinafter with reference to the embodiments and the drawings, but the embodiments of the present invention are not limited to this.

Embodiment 1

Figure 1:
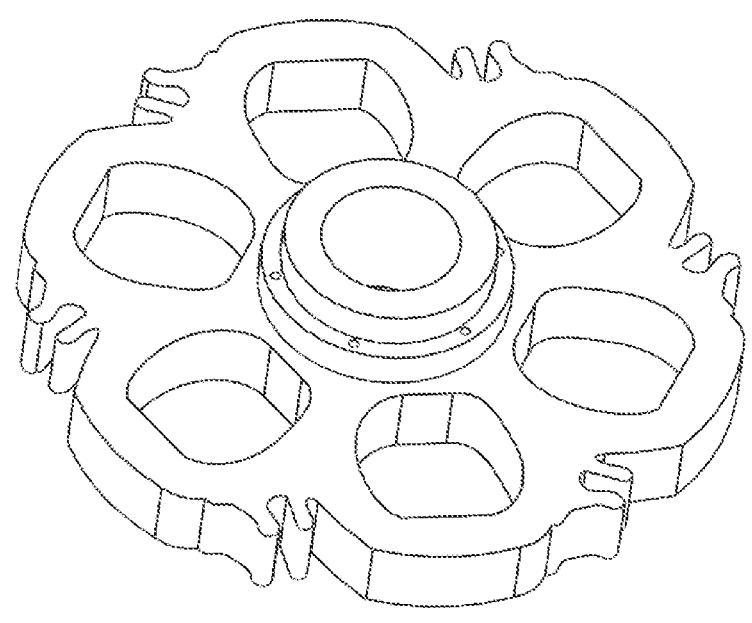
FIG. 1 is a schematic diagram of a six-hole disc-shaped part in the present invention.

With reference to FIG. 1 to FIG. 4, the embodiment takes machining of a uniformly distributed six-hole disc-shaped part as an example, and FIG. 1 is a schematic diagram of the six-hole disc-shaped part in the embodiment. The embodiment discloses a WEDM machine tool for machining a disc-shaped porous part, which comprises a workbench 31, a central stand column 34 arranged in a middle portion of the workbench 31, a rotary device 32 for driving the disc-shaped porous part to rotate, six wire rack assemblies 35 arranged on the workbench 31 for machining and a wire feeding mechanism 1 for guiding a feeding direction of an electrode wire. The six wire rack assemblies 35 are distributed along a circumference in a radical direction.

Figure 3:
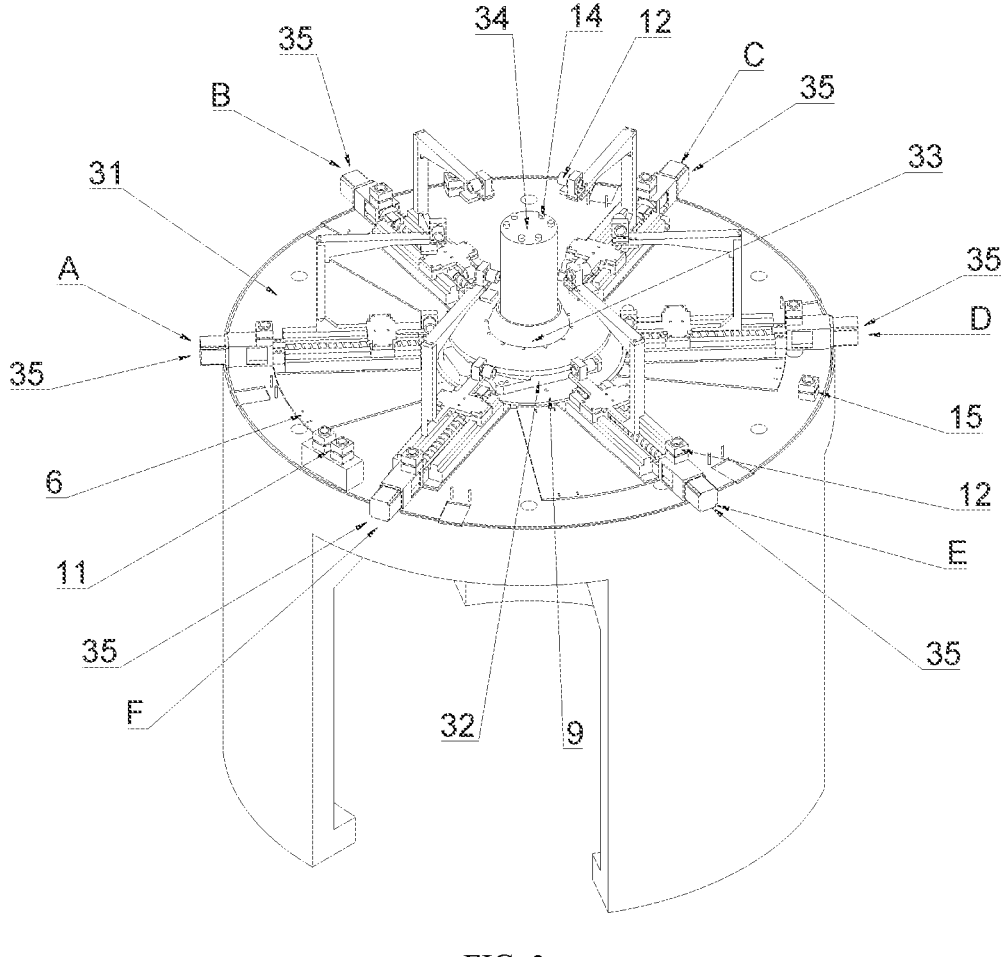

With reference to FIG. 3, the rotary device 32 is provided with a conical guide centering block 33 for positioning the disc-shaped porous part. A diameter of an upper end of the conical guide centering block 33 is gradually decreased upwardly, and by arranging the conical guide centering block 33, the disc-shaped porous part is coaxial with the rotary device 32 without eccentricity, thus ensuring a machining accuracy. In addition, the conical guide centering block can also adapt to fixing and positioning of disc-shaped parts with different central hole diameters, thus having a very high applicability.

Figure 13:
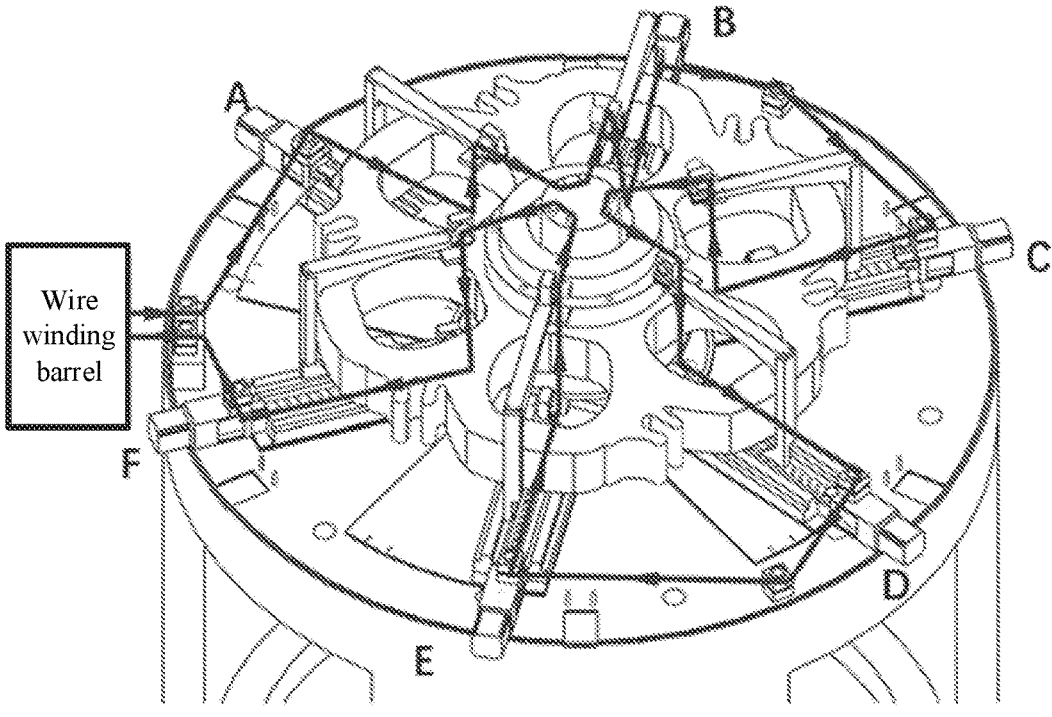
FIG. 13 is a schematic structural diagram of a wire feeding rout when the six-hole disc-shaped part is machined by the WEDM machine tool in the present invention.

With reference to FIG. 3 and FIG. 13, the rotary device 32 is located at a center of a surface of the workbench 31, and is used for supporting the disc-shaped part and driving the disc-shaped part to rotate, and in order to facilitate the positioning of the disc-shaped part, it is ensured that the disc-shaped part is concentric with the rotary device 32. The conical guide centering block 33 is arranged at an upper end of the rotary device 32, and the conical guide centering block 33 is coaxially arranged with the rotary device 32. A middle portion of the rotary device 32 has a hollow structure, and the central stand column 34 penetrates through the hollow structure of the rotary device. The disc-shaped part with the central hole is sleeved on the central stand column 34, a bottom surface is placed on the rotary device 32, and the disc-shaped part is centered through the hollow conical guide centering block 33. Combination of gear rotation and motor may be used in the rotary device 32.

With reference to FIG. 1, FIG. 6, and FIG. 8 to FIG. 10, each wire rack assembly 35 comprises a bottom plate 351 arranged on the workbench 31, a wire rack 352 arranged on the bottom plate 351 and a radial driving mechanism for driving the wire rack 352 to move on the bottom plate 351 in a radial direction. The wire rack 352 is a "["-shaped rack, and an opening of the "["-shaped rack is oriented to the central stand column 34. In the structure above, each wire rack 352 is driven by a separate radial driving mechanism, and the radial driving mechanism is controlled by the control device 70 in a unified mode, thus realizing synchronous feeding of the wire racks 352, and realizing linkage control with the rotary device 32 at the same time.

Figure 2:
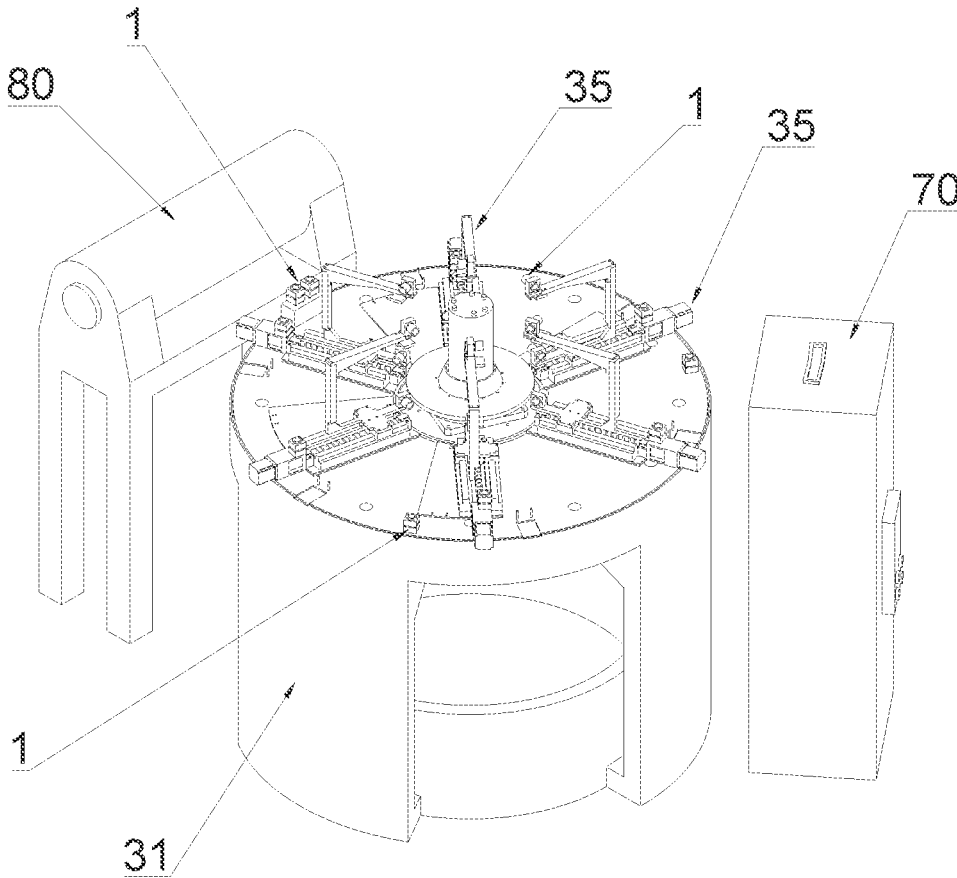
FIG. 2 is a schematic diagram of a stereoscopic structure of a WEDM machine tool for machining a disc-shaped porous part provided with a wire winding barrel and a control device in the present invention.
Figure 4:
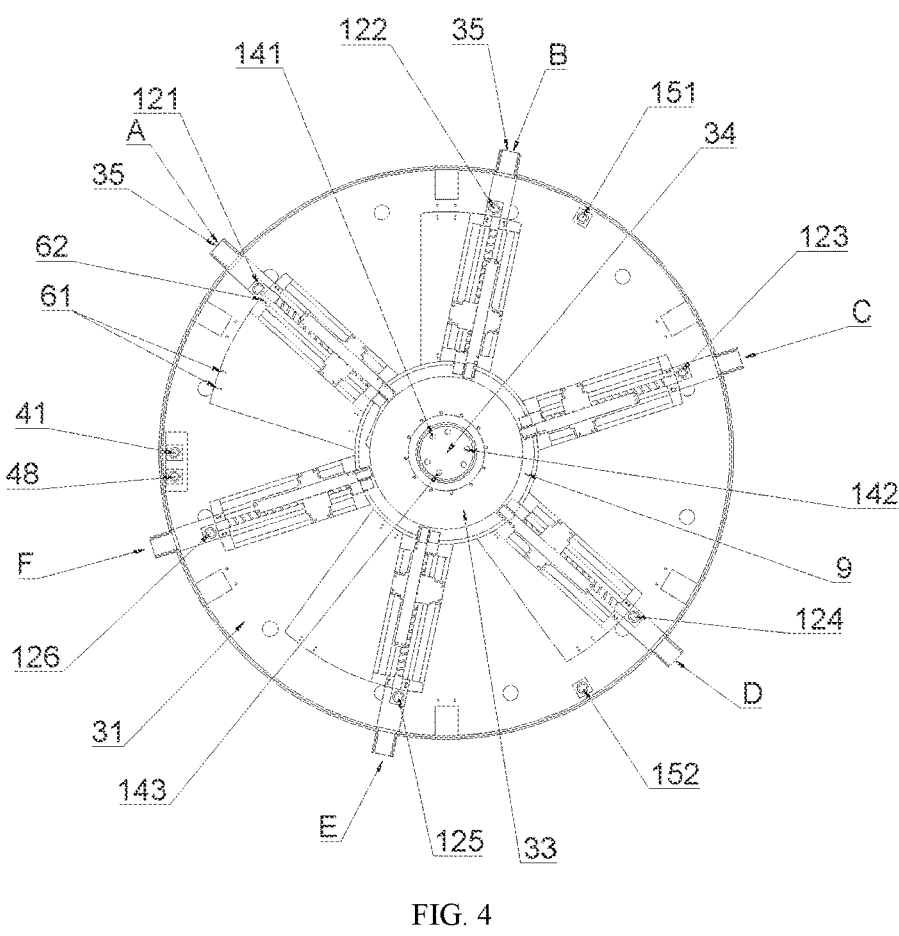
Figure 5:
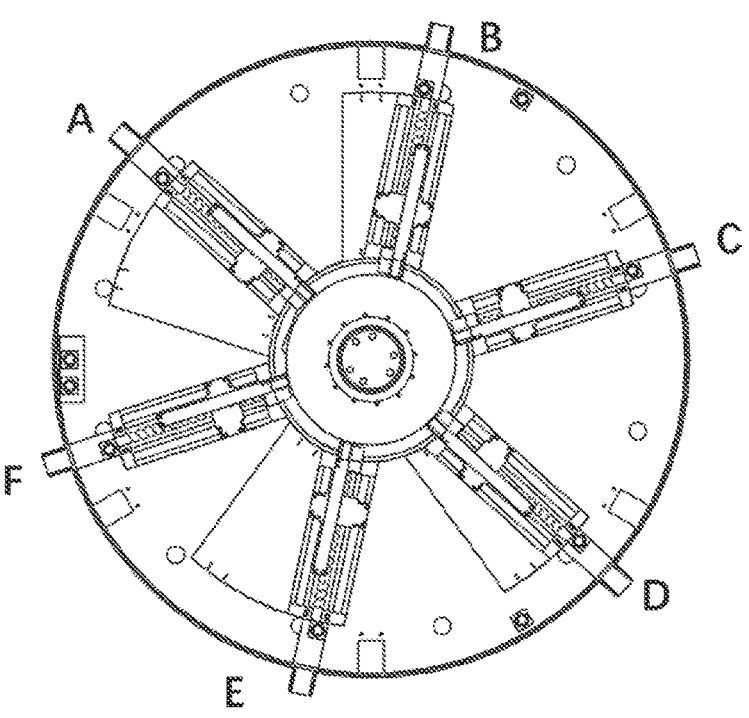
FIG. 5 is a schematic diagram of distribution of machining stations of the WEDM machine tool in the present invention.
Figure 6:
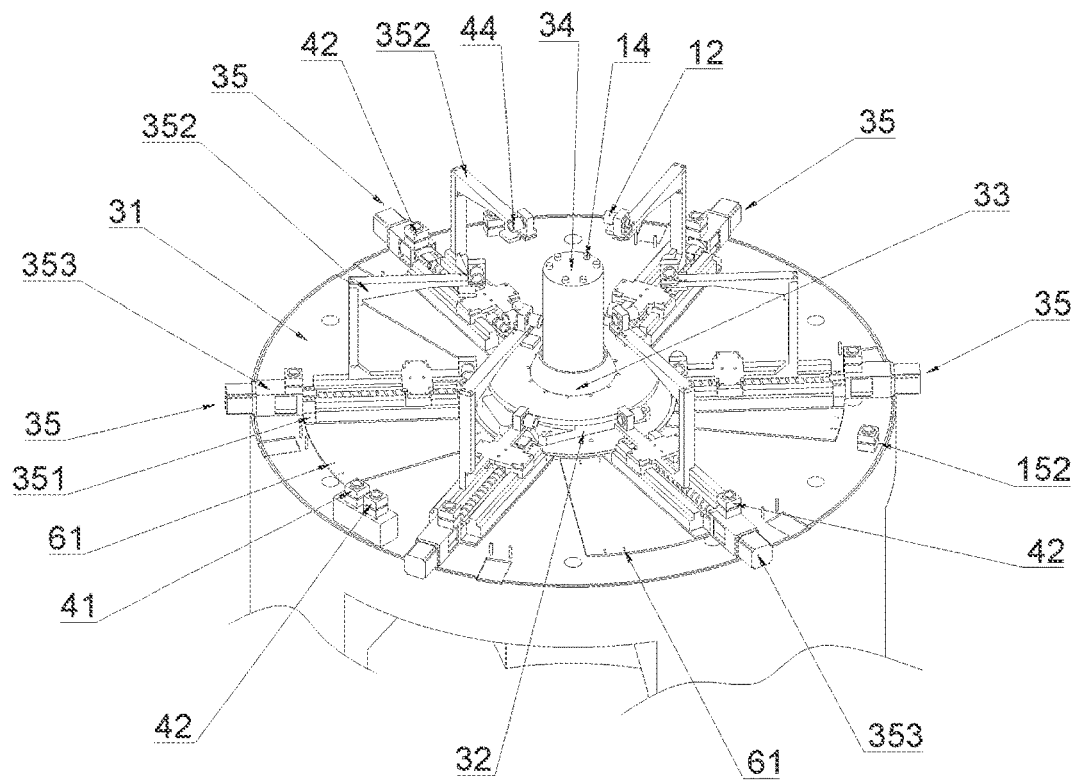
FIG. 6 is a schematic diagram of a partial structure of the WEDM machine tool in the present invention.

With reference to FIG. 2 to FIG. 4, the wire feeding mechanism 1 comprises a first guide wheel assembly 11 arranged on the workbench 31 to guide the electrode wire into and out of a wire winding barrel 80, a second guide wheel assembly 12 arranged on the radial driving mechanism and the wire rack 352, a third guide wheel assembly 14 arranged on the central stand column 34 and a fourth guide wheel assembly 15 arranged between two wire rack assemblies 35. Six wire rack assemblies 35 are provided, and six corresponding second guide wheel assemblies 12 are also provided, which are respectively a second guide wheel assembly 121, a second guide wheel assembly 122, a second guide wheel assembly 123, a second guide wheel assembly 124, a second guide wheel assembly 125 and a second guide wheel assembly 126. The electrode wire comes out of the wire winding barrel 80 and passes through the first guide wheel assembly 11, and then passes through the second guide wheel assembly 121, and under guidance of the third guide wheel assembly 14 and the fourth guide wheel assembly 15, the electrode wire passes through the remaining second guide wheel assemblies 122, 123, 124, 125 and 126, and finally returns to the wire winding barrel 80 through the first guide wheel assembly 11. Under guidance of the third guide wheel assembly 14 and the fourth guide wheel assembly 15, it can be ensured that the second guide wheel assembly 12 on each wire rack assembly 35 passes through the electrode wire, so as to synchronously machine six holes in the disc-shaped part.

With reference to FIG. 6 and FIG. 8 to FIG. 10, a guide assembly is arranged between the wire rack 352 and the bottom plate 351, the guide assembly comprises a guide rail 21 arranged on the bottom plate 351 and a sliding block 22 arranged at a lower end of the wire rack 352, and the guide rail 21 is connected with the sliding block 22 in a sliding fit mode. By arranging the guide assembly, it is ensured that the wire rack 352 moves more stably during feeding.

With reference to FIG. 6 and FIG. 8 to FIG. 10, the radial driving mechanism comprises a driving motor 353 arranged on the bottom plate 351, a screw rod 354 connected with a driving member of the driving motor 353, and a screw nut 355 arranged at a lower end of the wire rack 352 and connected with the screw rod 354 in a matching mode. In the structure above, the driving motor 353 drives the screw rod 354 to rotate, so that the screw nut 355 moves along an axis of the screw rod 354 to drive the wire rack 352 to move along the axis of the screw rod 354, thus realizing feeding of the wire rack 352.

With reference to FIG. 6 to FIG. 7 and FIG. 10 to FIG. 11, the wire rack 352 comprises a vertical arm 3521, an upper arm 3522 connected to an upper end of the vertical arm 3521 and a lower arm 3523 connected to a lower end of the vertical arm 3521. The second guide wheel assembly 12 comprises a guide wheel 42 arranged on a shell of the driving motor 353, an upper guide wheel 44 arranged at an end portion of the upper arm 3522 and a lower guide wheel 43 arranged at an end portion of the lower arm 3523. In the structure above, the electrode wire may pass through the guide wheel 42, the lower guide wheel 43 and the upper guide wheel 44 in sequence; or pass through the upper guide wheel 44, the lower guide wheel 43 and the guide wheel 42 in sequence. A specific wire feeding direction is determined according to an actual machining mode; and the electrode wire between the upper guide wheel 44 and the lower guide wheel 43 is used for cutting the part.

With reference to FIG. 3 to FIG. 4, each wire rack assembly 35 is capable of rotating around the workbench 31, so as to adjust an included angle between two adjacent wire rack assemblies 35. In the structure above, the wire rack assembly 35 may rotate around the workbench 31, and different positions of the wire rack assembly 35 on the workbench 31 may be adjusted, thus realizing flexible machining of the disc-shaped porous part.

With reference to FIG. 3 to FIG. 4, FIG. 6 to FIG. 9, and FIG. 12, the wire rack assembly 35 is capable of rotating around the center of the workbench 31 at a certain angle, thus realize machining of disc-shaped parts with different hole numbers and distribution states. A position fixing mechanism 6 for fixing the wire rack assembly 35 at different positions on the workbench is arranged between each wire rack assembly 35 and the workbench 31. The position fixing mechanism 6 comprises a plurality of sets of first positioning holes 61 arranged in the workbench 31 and second positioning holes 62 arranged in the bottom plate 351. The second positioning holes 62 correspond to each set of first positioning holes 61 in position. Through the structure above, by arranging the position fixing mechanism 6, a position of the wire rack assembly 35 in a circumferential direction may be adjusted, so that there may be different angles between two adjacent wire rack assemblies 35. In the plurality of sets of first positioning holes 61, each set of first positioning holes 61 represents a change of one position, and by matching the second positioning hole 62 with the first positioning hole 61, the position of the wire rack assembly 35 may be changed. After the position is adjusted, the second positioning hole and the first positioning hole 61 may be fixed through a bolt to achieve the purpose of positioning.

Figure 8:
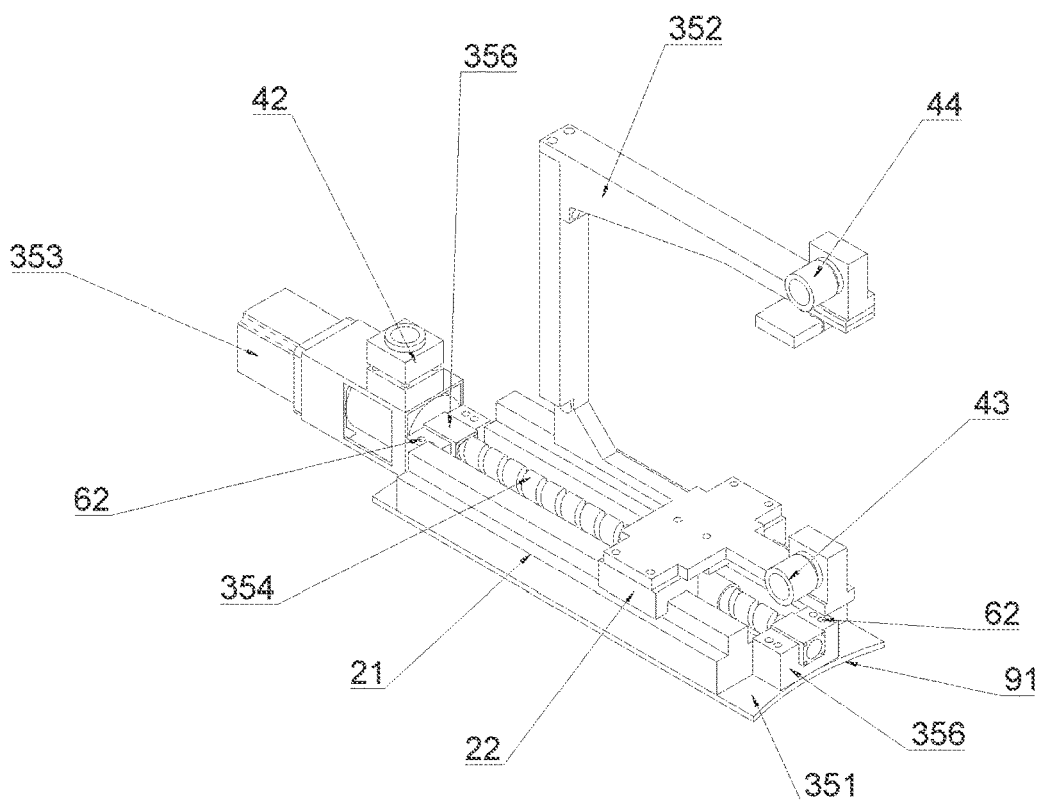
Figure 9:
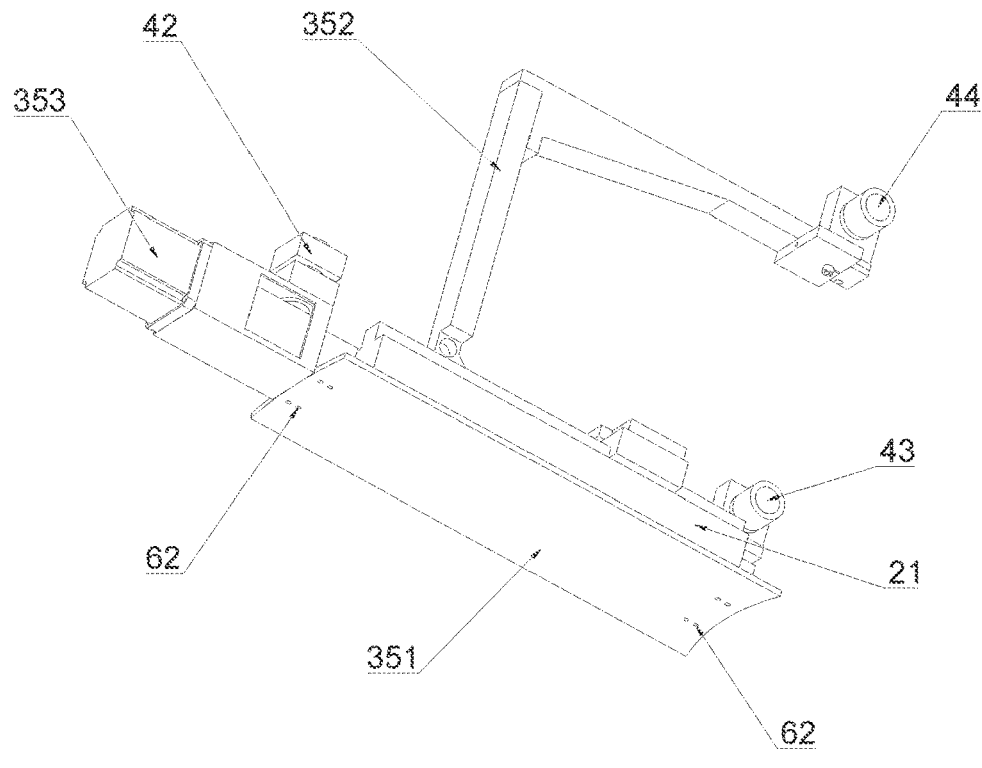
Figure 10:
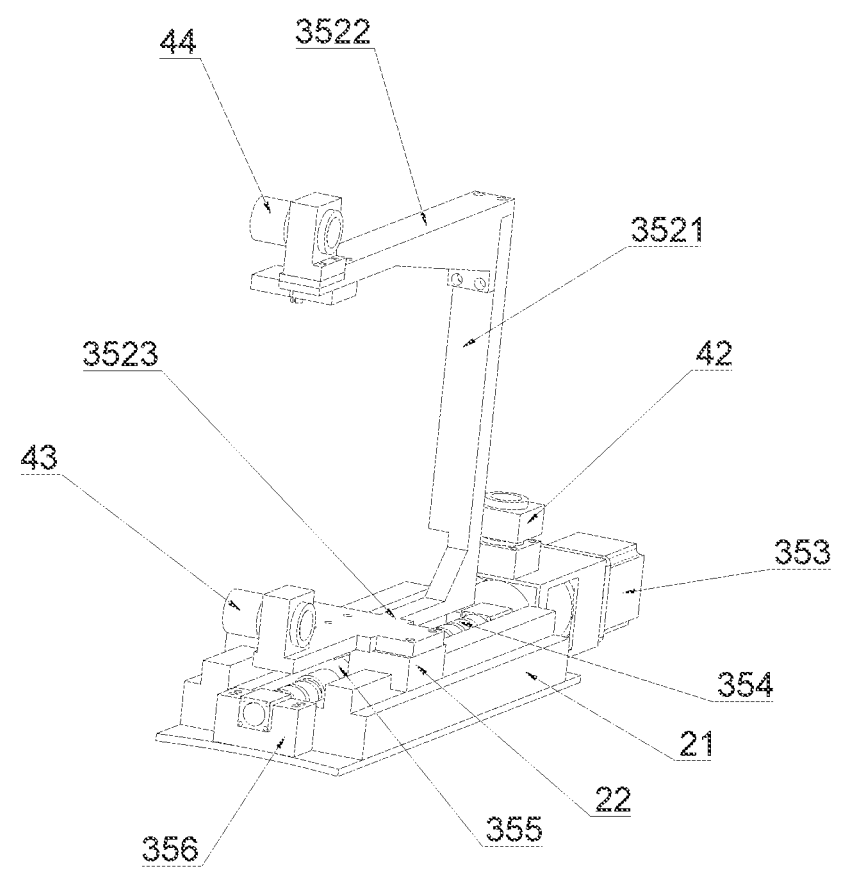
Figure 11:
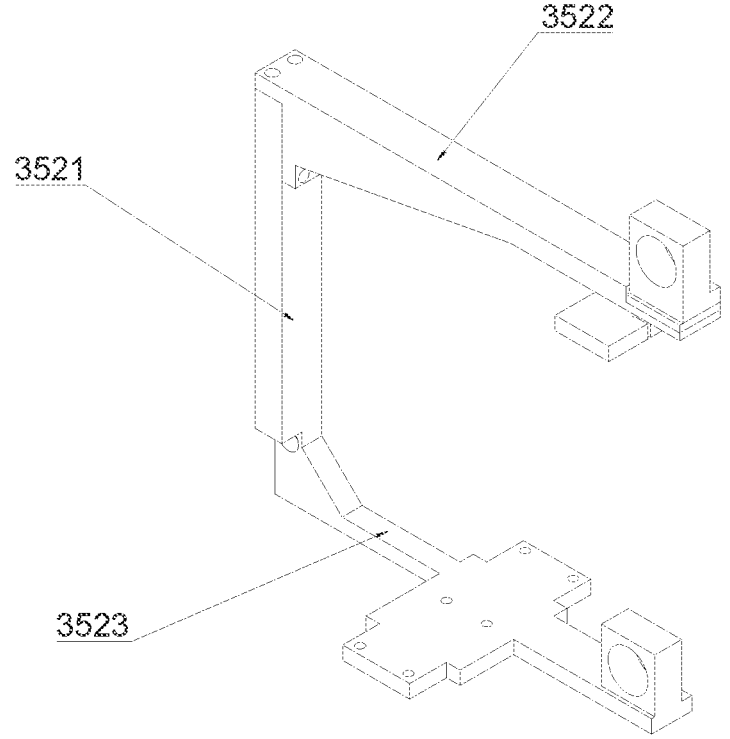
FIG. 11 is a schematic diagram of a stereoscopic structure of a wire rack in the present invention.
Figure 12:
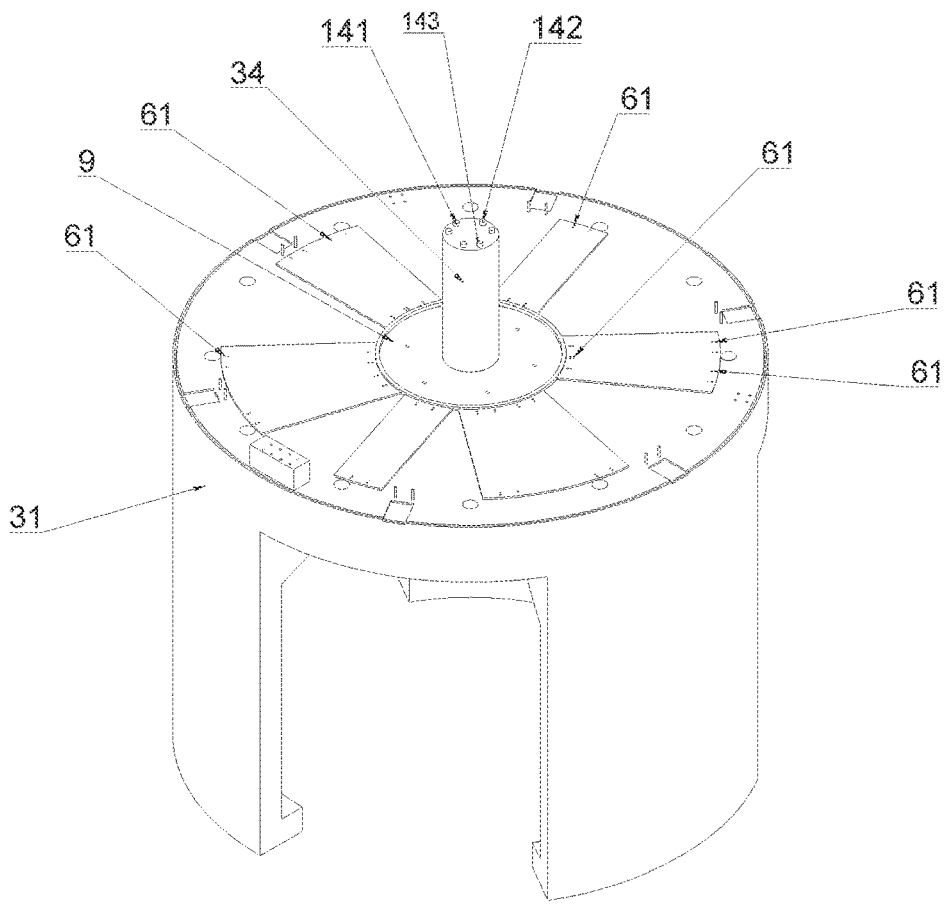
FIG. 12 is a schematic diagram of a stereoscopic structure of a workbench in the present invention.

With reference to FIG. 8 to FIG. 10, the screw rod 354 is fixed on the bottom plate 351 through two mounting seats 356, the driving motor 353 is mounted on the mounting seat 356, and the mounting seat 356 is also provided with second positioning holes 62, which correspond to the second positioning holes 62 in the bottom plate 351 one by one.

With reference to FIG. 3 to FIG. 7, six wire rack assemblies 35 respectively correspond to six stations, and the six stations are a station A, a station B, a station C, a station D, a station E and a station F in sequence. By arranging the six wire rack assemblies 35, six holes may be synchronously machined, and meanwhile, flexible feeding may also be performed through the wire feeding mechanism 1. For the wire rack assembly 35 to be operated, the electrode wire is correspondingly distributed on the second guide wheel assembly 12, and by matching with the position fixing mechanism 6, the position of the wire rack assembly 35 is adjusted, so that two holes, three holes, four holes or five holes may be flexibly machined.

With reference to FIG. 3 to FIG. 7 and FIG. 12, the first guide wheel assembly 11 is arranged between the station A and the station B, and the first guide wheel assembly 11 comprises a wire inlet guide wheel 41 and a wire outlet guide wheel 48. The third guide wheel assembly 14 comprises a first set of steering guide wheels 141, a second set of steering guide wheels 142 and a third set of steering guide wheels 143, and the first, second and third sets of steering guide wheels (141, 142 and 143) are all provided with two guide wheels. The first, second and third sets of steering guide wheels (141, 142 and 143) are respectively located in middle portions of extension lines of the station A and the station B, middle portions of extension lines of the station C and the station D, and middle portions of extension lines of the station E and the station F. The fourth guide wheel assembly 15 comprises a first tensioning guide wheel 151 and a second tensioning guide wheel 152 arranged on the workbench 31. The first tensioning guide wheel 151 is arranged between the station B and the station C, and the second tensioning guide wheel 152 is arranged between the station D and the station E. In the structure above, it is convenient to feed the electrode wire, and a wire feeding distance of the electrode wire can be reduced as much as possible. The electrode wire enters the station A from the wire inlet guide wheel 41 first, and finally returns to the wire outlet guide wheel 48 from the station F, and a direction of the electrode wire is adjusted to be parallel to a wire feeding direction, and then the electrode wire returns to the wire winding barrel 80.

With reference to FIG. 3 to FIG. 7 and FIG. 13, the WEDM machine tool in the embodiment may realize synchronous machining of six uniformly distributed holes. When the six uniformly distributed holes are machined, an included angle between two adjacent stations is 60°. A specific wire feeding route of the electrode wire is that:

the electrode wire comes out of the wire winding barrel 80, passes through the wire inlet guide wheel (41) to reach a guide wheel 42 in the station A, is steered to a lower guide wheel 43 in the station A, and then is fed upwardly to pass through an upper guide wheel 44 in the station A to enter the first set of steering guide wheels (141) on the central stand column 34, and under guidance of the first set of steering guide wheels (141), the electrode wire enters an upper guide wheel 44 in the station B, is fed downwardly to pass through a lower guide wheel 43 in the station B, and then passes through a guide wheel 42 in the station B; then, the electrode wire enters a guide wheel 42 in the station C under guidance of the first tensioning guide wheel (151) to reach a lower guide wheel 43 in the station C, and is fed upwardly to pass through an upper guide wheel 44 in the station C to enter the second set of steering guide wheels (142) on the central stand column 34, under guidance of the second set of steering guide wheels (142), the electrode wire enters an upper guide wheel 44 in the station D, is fed downwardly to pass through a lower guide wheel 43 in the station D, and then passes through a guide wheel 42 in the station D; and then, the electrode wire enters a guide wheel 42 in the station E under guidance of the second tensioning guide wheel (152) to reach a lower guide wheel 43 in the station E, and is fed upwardly to pass through an upper guide wheel 44 in the station E to enter the third set of steering guide wheels (143) on the central stand column 34, and under guidance of the third set of steering guide wheels (143), the electrode wire enters an upper guide wheel 44 in the station F, is fed downwardly to pass through a lower guide wheel 43 in the station F, then passes through a guide wheel 42 in the station F, and finally passes through the wire outlet guide wheel (48) to return to the wire winding barrel 80. In the structure above, the third guide wheel assembly 14 and the fourth guide wheel assembly 15 may change a direction of the electrode wire and guide the electrode wire into the wire rack assemblies 35 in different stations, wherein the fourth guide wheel assembly 15 can also play a role in tensioning the electrode wire, thus improving the machining accuracy.

Figure 7:
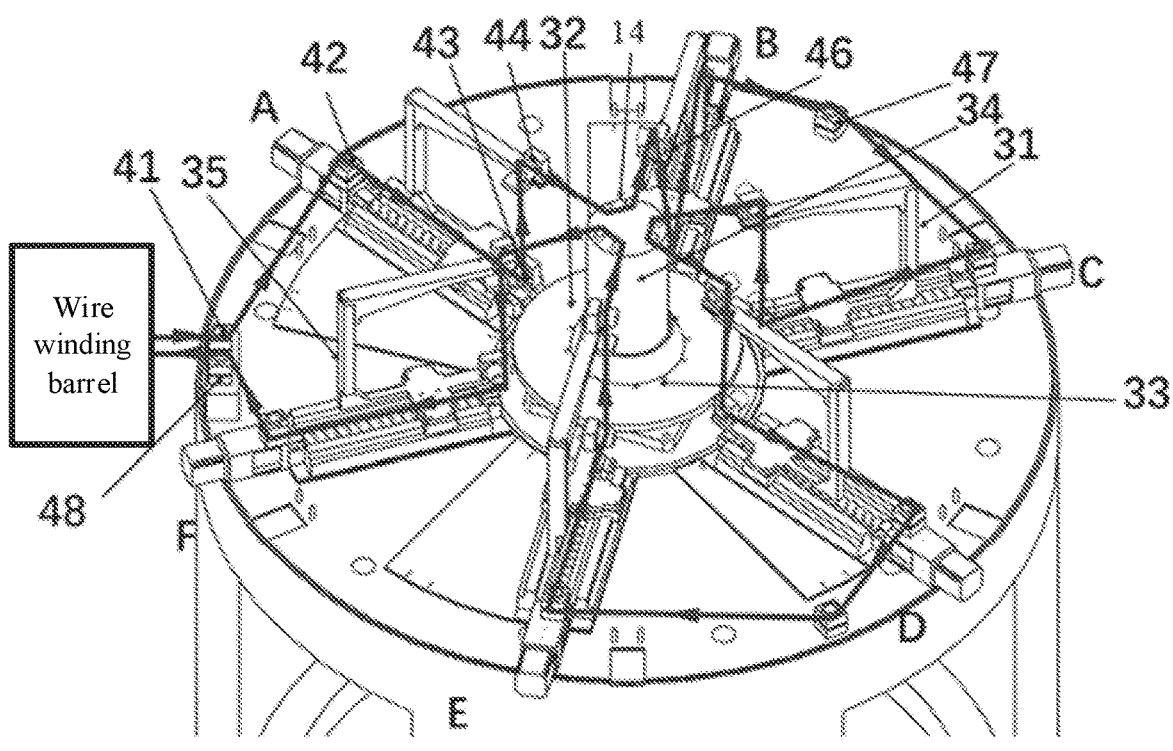
FIG. 7 is a schematic diagram of a wire feeding rout of an electrode wire of the six-hole disc-shaped part machined by the WEDM machine tool in the present invention.

With reference to FIG. 7, when the electrode wire enters the upper guide wheel 44 on the latter wire rack 352 from the upper guide wheel 44 on the previous wire rack 352 through the steering guide wheel 45, it must be ensured that the electrode wire will not deviate from a guide wheel groove to cause abrasion. Therefore, the guide wheel groove of the steering guide wheel 45 must be tangent to planes where guide wheel grooves of previous and latter upper guide wheels 44 are located respectively, and the guide wheel grooves of the previous and latter guide wheels 44 must also be tangent to a plane where the guide wheel groove of the steering guide wheel 45 is located.

The WEDM machine tool realizes the machining in a form of polar coordinates, the wire rack 352 moves linearly, and the part moves rotatably.

With reference to FIG. 1 to FIG. 10 and FIG. 13, a working principle of the WEDM machine tool for machining the disc-shaped porous part is that:

before the disc-shaped porous part is machined, a rough hole is formed in the disc-shaped porous part first for the electrode wire to penetrate through the disc-shaped porous part; when the disc-shaped porous part needs to be machined, the part is placed in the conical guide centering block 33 from the central stand column 34 to position the part, then the electrode wire is fed, and each wire rack assembly 35 is correspondingly provided with one second guide wheel assembly 12; and the electrode wire comes out of the wire winding barrel 80 and passes through the first guide wheel assembly 11, and then passes through the first second guide wheel assembly 121 (the second guide wheel assembly in the station A), under steering of the third guide wheel assembly 14, the electrode wire passes through the second guide wheel assembly 122 (the second guide wheel assembly in the station B), then under guidance of the fourth guide wheel assembly 15, the electrode wire enters the third second guide wheel assembly 123 (the second guide wheel assembly in the station C), then under steering of the third guide wheel assembly 14, the electrode wire passes through the fourth second guide wheel assembly 124 (the second guide wheel assembly in the station D), then under guidance of the fourth guide wheel assembly 15, the electrode wire enters the fifth second guide wheel assembly 125 (the second guide wheel assembly in the station E), and then under steering of the third guide wheel assembly 14, the electrode wire passes through the sixth second guide wheel assembly 126 (the second guide wheel assembly in the station F), and finally passes through the first guide wheel assembly 11 to return to the wire winding barrel 80. When passing through the second guide wheel assembly 12, the electrode wire may pass through the rough hole in the disc-shaped porous part. After wire feeding is completed, the part is machined, the rotary device 32 may drive the part to rotate, and the radial driving mechanism drives the wire rack 352 to feed in a radial direction, so as to drive the electrode wire of the second guide wheel assembly 12 to be fed continuously, thus completing machining of a two-dimensional hole. The six wire rack assemblies 35 work at the same time, thus realizing synchronous machining of six holes. The first second guide wheel assembly 121 is located on the station A, the second guide wheel assembly 122 is located on the station B, the third second guide wheel assembly 123 is located on the station C, the fourth second guide wheel assembly 124 is located on the station D, the fifth second guide wheel assembly 125 is located on the station E, and the sixth second guide wheel assembly 126 is located on the station F.

Embodiment 2

Figure 14:
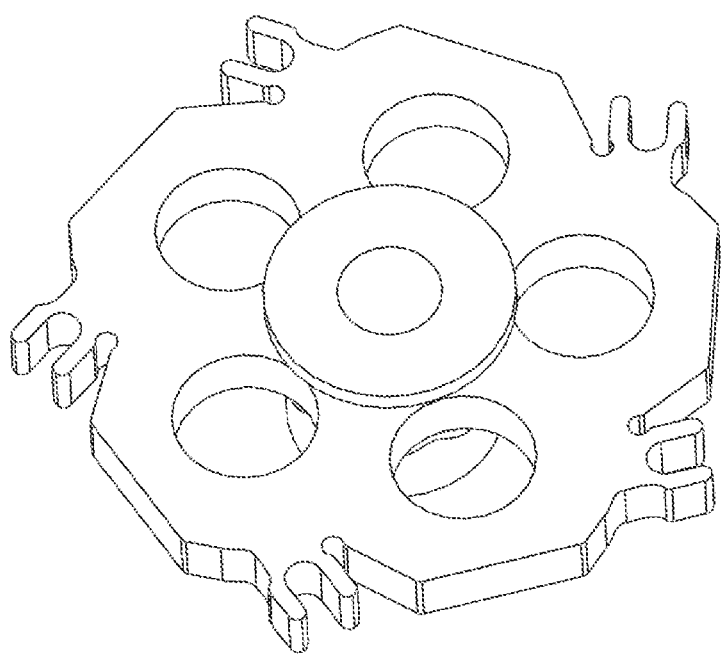
FIG. 14 is a schematic diagram of a five-hole disc-shaped part in the present invention.
Figure 15:
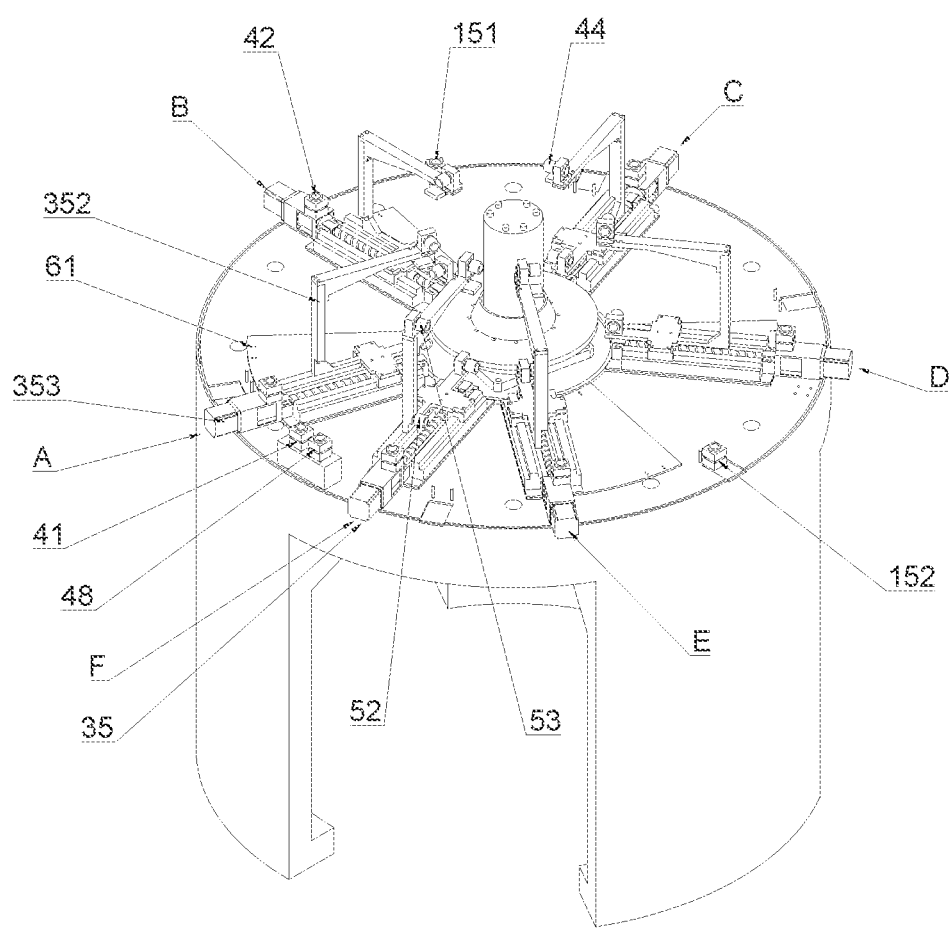
FIG. 15 is a schematic structural diagram of Second Embodiment of the WEDM machine tool in the present invention.
Figure 16:
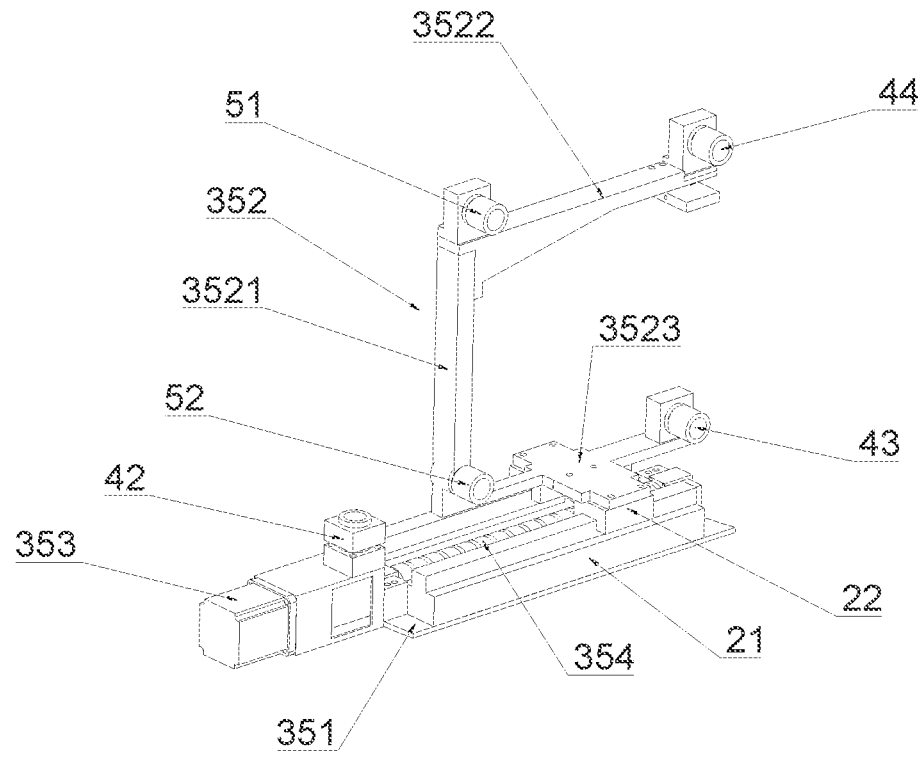
FIG. 16 is a schematic diagram of a stereoscopic structure of a wire rack assembly in the present invention.
Figure 17:
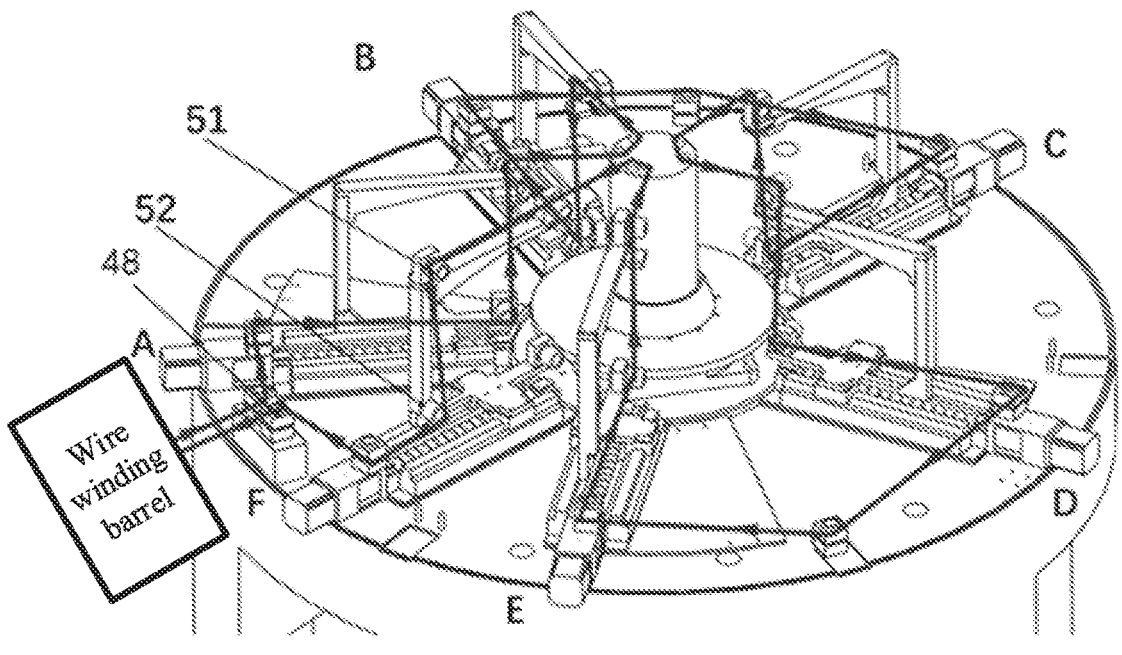
FIG. 17 is a schematic diagram of a wire feeding rout of an electrode wire of the five-hole disc-shaped part machined by the WEDM machine tool in the present invention.
Figure 18:
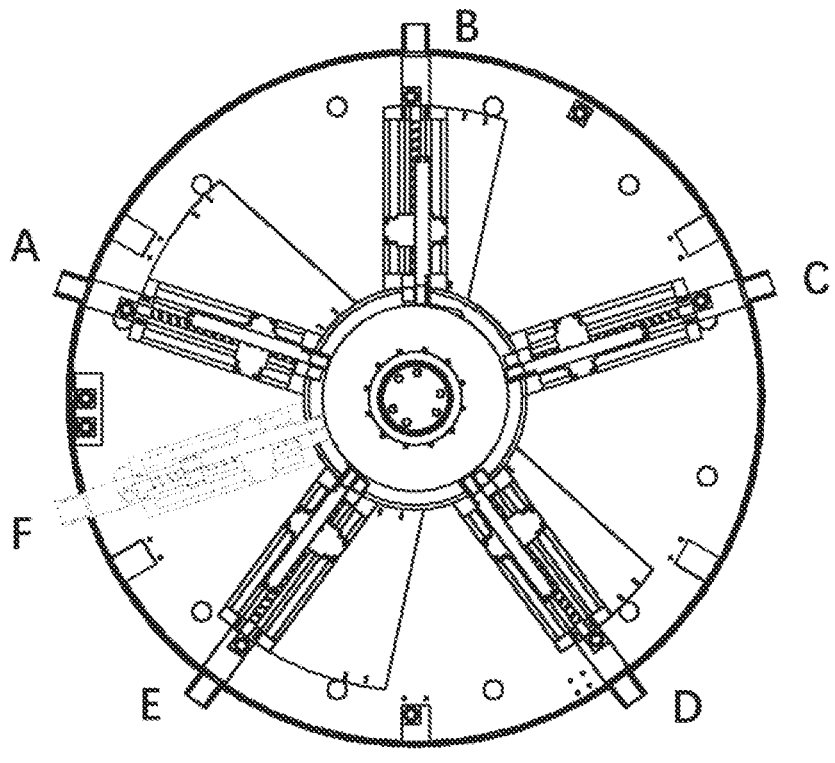
FIG. 18 is a schematic diagram of distribution of machining stations of the WEDM machine tool in the present invention.
Figure 19:
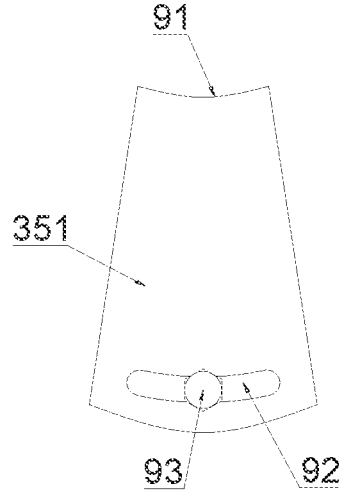
FIG. 19 is a schematic diagram of a bottom plate according to another embodiments of the present invention.
Figure 20:
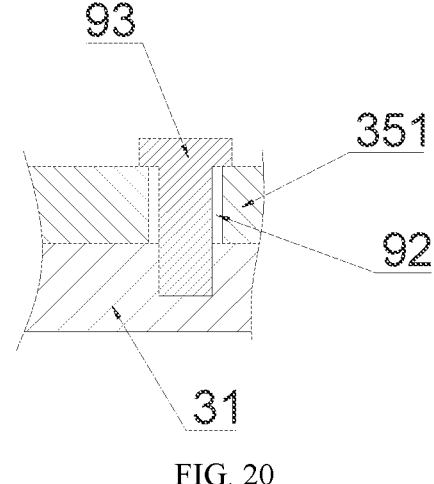
FIG. 20 is a cross sectional view of the bottom plate according to another embodiments of the present invention.

With reference to FIG. 14, the embodiment takes machining of a uniformly distributed five-hole disc-shaped part as an example, and FIG. 14 is a schematic diagram of the five-hole disc-shaped part in the embodiment.

With reference to FIG. 15 to FIG. 18, other structures in the embodiment are the same as those in Embodiment 1, except that a WEDM machine tool in the embodiment realizes machining of the five-hole disc-shaped part, and five holes are uniformly distributed. When the uniformly distributed five holes are machined, six wire rack assemblies 35 are also provided, the wire rack assembly 35 in the station F is in a non-working state, and the wire rack assemblies 35 in remaining five stations are in a working state. Positions of the five wire rack assemblies 35 in the working state are positioned and adjusted by the position fixing mechanism 6, so that an included angle between two adjacent wire rack assemblies 35 is 72°, which means that an included angle between two adjacent stations is 72°. The second guide wheel assembly 126 on the wire rack assembly 35 in the station F further comprises an upper auxiliary guide wheel 51 arranged at the upper end of the vertical arm 3521 and a lower auxiliary guide wheel 52 arranged at the lower end of the vertical arm 3521. A specific wire feeding route of the electrode wire is that:

the electrode wire comes out of the wire winding barrel 80, passes through the wire inlet guide wheel (41) to reach a guide wheel 42 in the station A, is steered to a lower guide wheel 43 in the station A, and then is fed upwardly to pass through an upper guide wheel 44 in the station A to enter the first set of steering guide wheels (141) on the central stand column 34, and under guidance of the first set of steering guide wheels (141), the electrode wire enters an upper guide wheel 44 in the station B, is fed downwardly to pass through a lower guide wheel 43 in the station B, and then passes through a guide wheel 42 in the station B; then, the electrode wire enters a guide wheel 42 in the station C under guidance of the first tensioning guide wheel (151) to reach a lower guide wheel 43 in the station C, and is fed upwardly to pass through an upper guide wheel 44 in the station C to enter the second set of steering guide wheels (142) on the central stand column 34, under guidance of the second set of steering guide wheels (142), the electrode wire enters an upper guide wheel 44 in the station D, is fed downwardly to pass through a lower guide wheel 43 in the station D, and then passes through a guide wheel 42 in the station D; and then, the electrode wire enters a guide wheel 42 in the station E under guidance of the second tensioning guide wheel (152) to reach a lower guide wheel 43 in the station E, and is fed upwardly to pass through an upper guide wheel 44 in the station E to enter the third set of steering guide wheels (143) on the central stand column 34, and under guidance of the third set of steering guide wheels (143), the electrode wire enters an upper guide wheel 44 in the station F, then passes through the upper auxiliary guide wheel 51, is fed downwardly to pass through the lower auxiliary guide wheel 52, then passes through a guide wheel 42 in the station F, and finally passes through the wire outlet guide wheel (48) to return to the wire winding barrel 80. In the structure above, a working mode of five-station synchronous machining is similar to that of six-station synchronous machining, but is different from that of six-station synchronous machining in that: in the working mode of five-station synchronous machining, it is unnecessary to feed the electrode wire to the lower guide wheel 43 in the station F, while it is necessary to adjust the wire feeing direction towards the upper auxiliary guide wheel 51 and the lower auxiliary guide wheel 52, then the electrode wire is fed to the first guide wheel assembly 11 between the station A and the station F, a direction of the electrode wire is adjusted to be parallel to a wire inlet direction by the first guide wheel assembly 11, and then the electrode wire returns to the wire winding barrel 80.

Embodiment 3

With reference to FIG. 3, FIG. 4, FIG. 8 and FIG. 19 to FIG. 20, other structures in the embodiment are the same as those in Embodiment 1, except that the position fixing mechanism 6 in Embodiment 1 is not used for position fixing in the embodiment. The structure used in the embodiment is that: the center of the workbench 31 is provided with a circular guide boss 9, an inner end of the bottom plate 351 is provided with an arc-shaped groove 91, the arc-shaped groove 91 is connected with an outer side of the circular guide boss 9 in a matching mode, an outer end of the bottom plate 351 is provided with a circular arc groove 92, the circular arc groove 92 is provided with a fixing bolt 93 for fixing the bottom plate 351 on the workbench 31, and the fixing bolt 93 penetrates through the circular arc groove 92 and is connected with the workbench. By arranging the circular guide boss 9 and the arc-shaped groove 91, the bottom plate 351 may rotate along the circular guide boss 9, so that the wire rack assembly 35 rotates around the center of the workbench 31, and the bottom plate 351 may be accurately positioned at the same time. By arranging the circular arc groove 92 and the fixing bolt 93, it is convenient to adjust the angle between the wire rack assemblies 35, and the fixing bolt 93 facilitates fixing and positioning the bottom plate 351, and also facilitates disassembling the bottom plate. The circular guide boss 9 and the fixing bolt 93 may position the bottom plate 351 in a radial direction, after the fixing bolt 93 is loosened, the bottom plate 351 is moved in a circumferential direction, and after the bottom plate is moved to a specified position, the fixing bolt 93 is tightened to fix the bottom plate 351.

Figure 21:
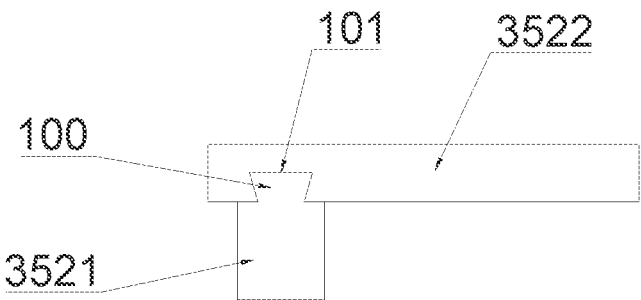
FIG. 21 is a schematic diagram showing the connection between the upper arm and the vertical arm according to another embodiments of the present invention.

With reference to FIG. 21, the upper arm 3522 may be adjusted up and down on the vertical arm 3521, the upper arm 3522 is provided with a wedge-shaped block 100, the vertical arm 3521 is provided with a vertically extended wedge-shaped groove 101, and the wedge-shaped block 100 and the wedge-shaped groove 101 are in sliding fit with each other. Through the structure above, the upper arm 3522 may move up and down on the vertical arm 3521, and a height of the upper arm 3522 may be adjusted according to a thickness of the part.

The above are the preferred embodiments of the present invention, but the embodiments of the present invention are not limited by the above contents. Any other changes, modifications, substitutions, combinations, and simplifications made without departing from the spirit and principle of the present invention should be equivalent substitute modes, and should be included in the scope of protection of the present invention.

The invention claimed is:

1. A wire electrical-discharge machining (WEDM) machine tool for machining a disc-shaped porous part, comprising:

a workbench, a central stand column arranged in a middle portion of the workbench, a first motor and a rotating gear for driving the disc-shaped porous part to rotate, a plurality of wire rack assemblies arranged on the workbench for machining, and a wire feeding mechanism for guiding a feeding direction of an electrode wire, wherein the plurality of wire rack assemblies are radially distributed around a center of the workbench, and each of the plurality of wire rack assemblies comprises a bottom plate, a radial driving mechanism arranged on the bottom plate and a wire rack fixed on a sliding block of the radial driving mechanism; and the wire rack is a "["-shaped rack, and an opening of the "["-shaped rack is oriented to the central stand column; and the wire feeding mechanism comprises a first guide wheel assembly (11) arranged on the workbench to guide the electrode wire into and out of a wire winding barrel, second guide wheel assemblies (121, 122, 123, 124, 125, 126) arranged on the radial driving mechanism and the wire rack, a third guide wheel assembly (14) arranged on the central stand column and a fourth guide wheel assembly (15) arranged between two wire rack assemblies; and the electrode wire comes out of the wire winding barrel and passes through the first guide wheel assembly (11), and then passes through the second guide wheel assembly (121), and under guidance of the third guide wheel assembly (14) and the fourth guide wheel assembly (15), the electrode wire passes through the remaining second guide wheel assemblies (122, 123, 124, 125, 126) in sequence, and finally passes through the first guide wheel assembly to return to the wire winding barrel;

wherein the radial driving mechanism comprises a second motor arranged on the bottom plate, a screw rod connected to the second motor, and a screw nut matched with the screw rod, the second motor is configured to drive the screw rod to rotate, so that the screw nut moves along an axis of the screw rod to drive the wire rack to move along the axis of the screw rod;

the wire rack comprises a vertical arm, an upper arm connected to an upper end of the vertical arm and a lower arm connected to a lower end of the vertical arm; and each of the second guide wheel assemblies comprises a guide wheel arranged on the second motor, an upper guide wheel arranged at an end portion of the upper arm, and a lower guide wheel arranged at an end portion of the lower arm;

six wire rack assemblies are provided, and the six wire rack assemblies respectively correspond to six stations: a station A, a station B, a station C, a station D, a station E, and a station F;

the third guide wheel assembly (14) comprises a first set of steering guide wheels (141), a second set of steering guide wheels (142), and a third set of steering guide wheels (143); the first guide wheel assembly (11) comprises a wire inlet guide wheel (41) and a wire outlet guide wheel (48); and the fourth guide wheel assembly (15) comprises a first tensioning guide wheel (151) and a second tensioning guide wheel (152); and wherein when six uniformly distributed holes are machined, an included angle between two adjacent stations is 60 degrees; and a first specific wire feeding route of the electrode wire is that:

the electrode wire comes out of the wire winding barrel, passes through the wire inlet guide wheel (41) to reach a guide wheel in the station A, is steered to a lower guide wheel in the station A, and then is fed upwardly to pass through an upper guide wheel in the station A to enter the first set of steering guide wheels (141) on the central stand column, and under guidance of the first set of steering guide wheels (141), the electrode wire enters an upper guide wheel in the station B, is fed downwardly to pass through a lower guide wheel in the station B, and then passes through a guide wheel in the station B; then, the electrode wire enters a guide wheel in the station C under guidance of the first tensioning guide wheel (151) to reach a lower guide wheel in the station C, and is fed upwardly to pass through an upper guide wheel in the station C to enter the second set of steering guide wheels (142) on the central stand column, and under guidance of the second set of steering guide wheels (142), the electrode wire enters an upper guide wheel in the station D, is fed downwardly to pass through a lower guide wheel in the station D, and then passes through a guide wheel in the station D; and then, the electrode wire enters a guide wheel in the station E under guidance of the second tensioning guide wheel (152) to reach a lower guide wheel in the station E, and is fed upwardly to pass through an upper guide wheel in the station E to enter the third set of steering guide wheels (143) on the central stand column, and under guidance of the third set of steering guide wheels (143), the electrode wire enters an upper guide wheel in the station F, is fed downwardly to pass through a lower guide wheel in the station F, then passes through a guide wheel in the station F, and finally passes through the wire outlet guide wheel (48) to return to the wire winding barrel.

2. The WEDM machine tool for machining the disc-shaped porous part according to claim 1, wherein a middle portion of the rotating gear has a hollow structure, and the central stand column penetrates through the hollow structure of the rotating gear.

3. The WEDM machine tool for machining the disc-shaped porous part according to claim 1, wherein the rotating gear is provided with a conical guide centering block for positioning the disc-shaped porous part.

4. The WEDM machine tool for machining the disc-shaped porous part according to claim 1, wherein each of the plurality of wire rack assemblies is capable of rotating around the center of the workbench, so as to adjust an included angle between two adjacent wire rack assemblies.

5. The WEDM machine tool for machining the disc-shaped porous part according to claim 4, wherein the center of the workbench is provided with a circular guide boss, an inner end of the bottom plate is provided with an arc-shaped groove, the arc-shaped groove is connected with an outer side of the circular guide boss in a matching mode, an outer end of the bottom plate is provided with a circular arc groove, and the circular arc groove is provided with a fixing bolt for fixing the bottom plate on the workbench.

6. The WEDM machine tool for machining the disc-shaped porous part according to claim 1, wherein when five uniformly distributed holes are machined, one of the plurality of wire rack assemblies in the station F is in a non-working state, and others of the plurality of wire rack assemblies in remaining stations are in a working state, wherein an included angle between two adjacent stations in the working state is 72 degrees, and the second guide wheel assembly (126) on the wire rack assembly in the station F further comprises an upper auxiliary guide wheel (51) arranged at the upper end of the vertical arm and a lower auxiliary guide wheel (52) arranged at the lower end of the vertical arm; and a second specific wire feeding route of the electrode wire is that:

the electrode wire comes out of the wire winding barrel, passes through the wire inlet guide wheel (41) to reach the guide wheel in the station A, is steered to the lower guide wheel in the station A, and then is fed upwardly to pass through the upper guide wheel in the station A to enter the first set of steering guide wheels (141) on the central stand column, and under guidance of the first set of steering guide wheels (141), the electrode wire enters the upper guide wheel in the station B, is fed downwardly to pass through the lower guide wheel in the station B, and then passes through the guide wheel in the station B; then, the electrode wire enters the guide wheel in the station C under guidance of the first tensioning guide wheel (151) to reach the lower guide wheel in the station C, and is fed upwardly to pass through the upper guide wheel in the station C to enter the second set of steering guide wheels (142) on the central stand column, and under guidance of the second set of steering guide wheels (142), the electrode wire enters the upper guide wheel in the station D, is fed downwardly to pass through the lower guide wheel in the station D, and then passes through the guide wheel in the station D; and then, the electrode wire enters the guide wheel in the station E under guidance of the second tensioning guide wheel (152) to reach the lower guide wheel in the station E, and is fed upwardly to pass through the upper guide wheel in the station E to enter the third set of steering guide wheels (143) on the central stand column, and under guidance of the third set of steering guide wheels (143), the electrode wire enters the upper guide wheel in the station F, then passes through the upper auxiliary guide wheel (51), is fed downwardly to pass through the lower auxiliary guide wheel (52), then passes through the guide wheel in the station F, and finally passes through the wire outlet guide wheel (48) to return to the wire winding barrel.

* * * * *